United States Patent [19]
Loiseaux et al.

[11] Patent Number: 5,467,206
[45] Date of Patent: Nov. 14, 1995

[54] COLOR DISPLAY DEVICE WITH INTERVENING LENS AND SPATIAL FILTER OR WITH OVERLAPPING BEAMS OF CHROMATICALLY SEPARATED LIGHT BETWEEN THE CHROMATIC SEPARATOR AND LENS ARRAY

[75] Inventors: Brigitte Loiseaux, Villebon Sur Yvette; Cécile Joubert; Jean-Pierre Huignard, both of Paris; Pascal Joffre, Palaiseau; Christophe Nicolas, Le Kremlin Bicetre, all of France

[73] Assignee: Thomson-CSF, Paris, France

[21] Appl. No.: 267,904

[22] Filed: Jul. 6, 1994

[30] Foreign Application Priority Data

Jul. 9, 1993 [FR] France ................... 93 08470

[51] Int. Cl.[6] .................. G02F 1/1335; G03B 21/26; G03B 21/14
[52] U.S. Cl. .................. 359/40; 353/34; 353/38; 359/49
[58] Field of Search ................ 359/40, 41, 49; 353/33, 34, 20, 31, 38

[56] References Cited

U.S. PATENT DOCUMENTS

| | | | |
|---|---|---|---|
| 4,153,336 | 5/1979 | Minami et al. | 359/40 |
| 4,413,885 | 11/1983 | Hareng et al. | 359/50 |
| 4,505,536 | 3/1985 | Huignard et al. | 359/7 |
| 5,042,921 | 8/1991 | Makoto et al. | 359/40 |
| 5,150,241 | 9/1992 | Joffre et al. | 359/89 |
| 5,151,825 | 9/1992 | Nicolas | 359/634 |
| 5,181,054 | 1/1993 | Nicolas et al. | 353/20 |
| 5,206,674 | 4/1993 | Puech et al. | 353/122 |
| 5,260,815 | 11/1993 | Takizawa | 359/41 |
| 5,272,496 | 12/1993 | Nicolas et al. | 353/34 |
| 5,272,551 | 12/1993 | Lehureau et al. | 359/19 |
| 5,276,538 | 1/1994 | Monji et al. | 359/40 |
| 5,299,036 | 3/1994 | Nicolas et al. | 359/40 |

FOREIGN PATENT DOCUMENTS

| | | | |
|---|---|---|---|
| 0465171A2 | 1/1992 | European Pat. Off. . | |
| 62-150317 | 7/1987 | Japan | 359/49 |
| 2152724 | 8/1985 | United Kingdom | 359/40 |

*Primary Examiner*—Anita Pellman Gross
*Assistant Examiner*—Walter J. Malinowski
*Attorney, Agent, or Firm*—Oblon, Spivak, McClelland, Maier, & Neustadt

[57] ABSTRACT

A color display device comprises a source of light simultaneously emitting several ranges of chromatic components and a spatial light modulator comprising several dots, each dot comprising at least one sub-pixel per range of chromatic component to be displayed. Between the light source and the spatial light modulator there are provided at least one chromatic separator angularly separating the light of the different chromatic range along different directions, a lens focusing the light of the different chromatic ranges at distinct points or along distinct lines contained in a determined plane, at least one spatial filter located along this determined plane and selectively filtering the light of the different chromatic ranges, and an array of lenses, each enabling the focusing of the light of each chromatic range substantially on a sub-pixel.

15 Claims, 10 Drawing Sheets

COLOR DISPLAY DEVICE WITH INTERVENING LENS AND SPATIAL FILTER OR WITH OVERLAPPING BEAMS OF CHROMATICALLY SEPARATED LIGHT BETWEEN THE CHROMATIC SEPARATOR AND LENS ARRAY

BACKGROUND OF THE INVENTION

The invention relates to a color display device and more particularly to a liquid crystal color display device.

The current trend, for the generation of large-sized video images, is towards the use of liquid crystal active matrices (LCD screens) in projection devices.

The projection of color images can be achieved either with three LCD screens, each illuminated by one of the three primary components, namely the red, green or blue (R, G, B) components, or with a single trichromatic LCD screen which is then provided with colored filters.

The integration of R, G, B colored filters into the structure of an LCD screen enables the making of color image projection devices whose design is simple because they are formed by only one source and only one LCD screen. These so-called "monovalve" projection devices are nevertheless limited, at present, to the projection of poor-quality, low-resolution images because of the following drawbacks:

—low light efficiency related to the spatial distribution of these colored filters which divide the effective transmission of the LCD screen by three;

—the non-negligible absorption of the colored filters furthermore limits the power of the light sources that can be used with these screens;

—the technological cost entailed by the making of these screens is high: it arises firstly from the implementation of these filters in the liquid crystal cell and, secondly, from a density of picture elements (pixels) that is greater for color screens than it is for monochromatic screens if they are to be made in reasonable dimensions (<6 inches diagonally).

The device according to the invention can be used to make an LCD monovalve projector whose light efficiency is greater than that of the usual devices. The expected theoretical gain is 3 to 6. This device implements a particularly compact structure to achieve the R, G, B color illumination of the LCD screen of a monovalve projector. The advantages of this device may be described as follows:

—the elimination of the technological steps for the making of the colored filters for trichomatic video-controlled LCD screens: the chromatic separation is obtained by a grating-type function;

—the improvement of the light efficiency of projection through the function of the focusing of the illumination white source in the pixels of the LCD screen: an array of cylindrical micro-lenses attached to the front face of the LCD screens can be used to generate R, G, B colored lines that are focused in one dimension in the plane of the liquid crystal;

—the pre-filtering of the source and the matching of the section of the illumination beam to the $^{16}/_9$ rectangular format of the LCD screen can be achieved simultaneously through the chromatic separation component.

SUMMARY OF THE INVENTION

The invention therefore relates to a color display device comprising a light source that simultaneously emits several ranges of chromatic components and a spatial light modulator comprising several dots, each comprising one sub-pixel per range of chromatic components to be displayed, wherein said device also comprises the following between the light source and the spatial light modulator:

—at least one chromatic separator separating the light of the different chromatic ranges angularly along different directions;

—a lens focusing the light of the different chromatic ranges at distinct points or along distinct lines contained in a determined plane;

—at least one spatial filter located along this determined plane and selectively filtering the light of the different chromatic ranges;

—an array of lenses, each enabling the focusing of the light of each chromatic range substantially on a sub-pixel.

The invention also relates to a color display device comprising a light source simultaneously emitting several ranges of chromatic components and a spatial light modulator comprising several dots each comprising one sub-pixel per range of chromatic component to be displayed, wherein said device also comprises the following between the light source and the spatial light modulator:

—at least one chromatic separator comprising a component with phase microstructures (index variations or relief features) obtained by optical recording in a photosensitive material, this separator separating the light of the different chromatic ranges angularly along different directions;

—an array of lenses each enabling the focusing of the light of each chromatic range substantially on a sub-pixel.

BRIEF DESCRIPTION OF THE DRAWINGS

The different objects and features of the invention shall appear more clearly from the following description, made by way of an example, and from the appended figures of which.

MORE DETAILED DESCRIPTION

Figure 1:
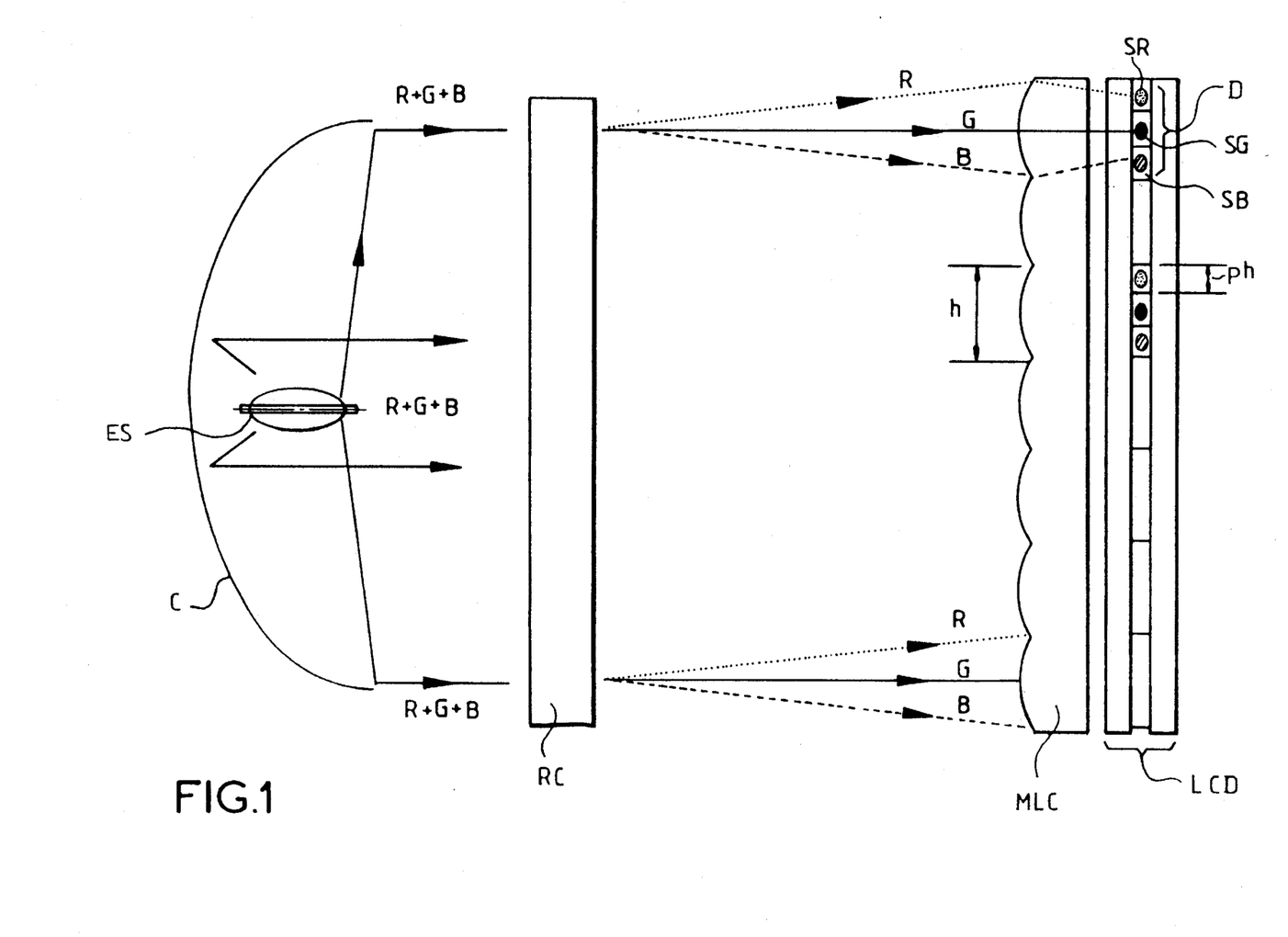
—FIG. 1 exemplifies a simplified embodiment of the device according to the invention.

Referring to FIG. 1, a description shall first of all be given of an exemplary simplified embodiment of the device according to the invention. This device comprises:

—a white illumination source S comprising a prior art optical system C to collimate the light emitted by the lamp;

—a chromatic separator element RC that enables the angular separation of the three primary colors red, green, blue (R, G, B) of the source S along the three chosen directions, and according to the invention this separator is recorded optically in a photosensitive material and is then constituted by phase microstructures (index variations or relief features);

—an array of cylindrical micro-lenses (MLC) positioned before the LCD screen (possibly directly on the back-plate of the LCD);

—a liquid crystal screen (LCD) devoid of colored filters that spatially modulates the illumination source as a function of the trichromatic video signals R, G, B.

Figure 2A:
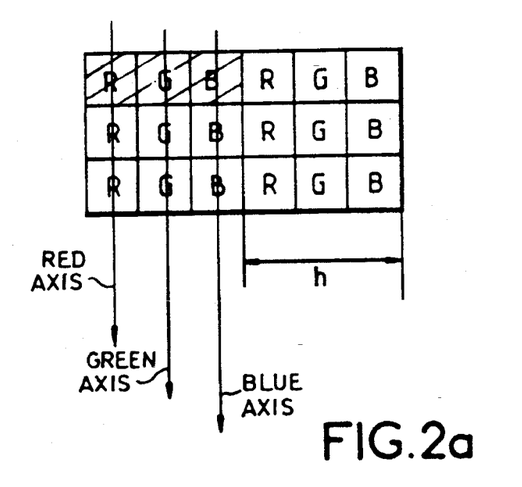
—FIGS. 2a to 2c exemplify arrangements of the picture elements of a liquid crystal screen.
Figure 2B:
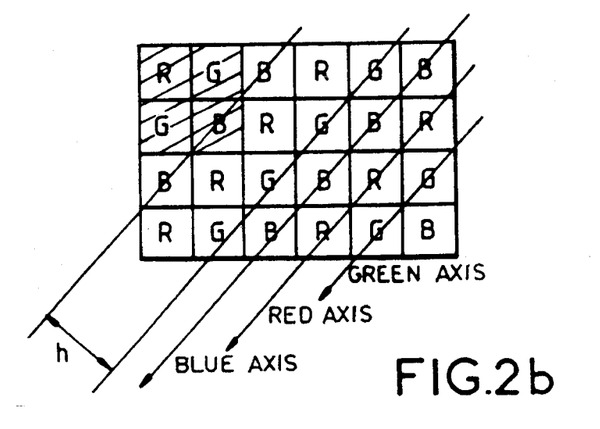
Figure 2C:
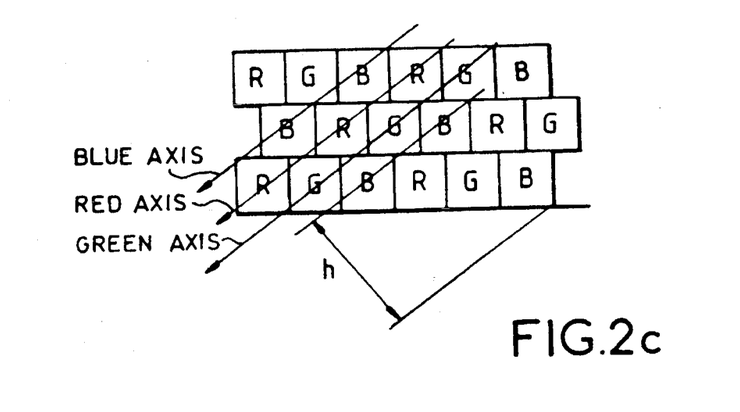

It is recalled that, in trichromatic screens, a white pixel D formed by three sub-pixels SR, SG, SB (each having the height ph in FIG. 1) is generally called a dot. FIGS. 2a to 2c give examples of distributions of color in a dot.

FIG. 2a shows an arrangement wherein the pixels of one and the same color are aligned vertically.

FIG. 2b shows an arrangement wherein the pixels of one and the same color are aligned diagonally and touch one another.

FIG. 2c shows an arrangement wherein the pixels of one and the same color are aligned in an inclined direction but do not touch one another.

It will be noted therefore that is always possible to find an axis along which the filters of one and the same color are arranged.

In the present device, the cylindrical lenses will be oriented in parallel to this axis. Their height (h) corresponds to the distance between two successive axes of sub-pixels of one and the same color.

Figure 3:
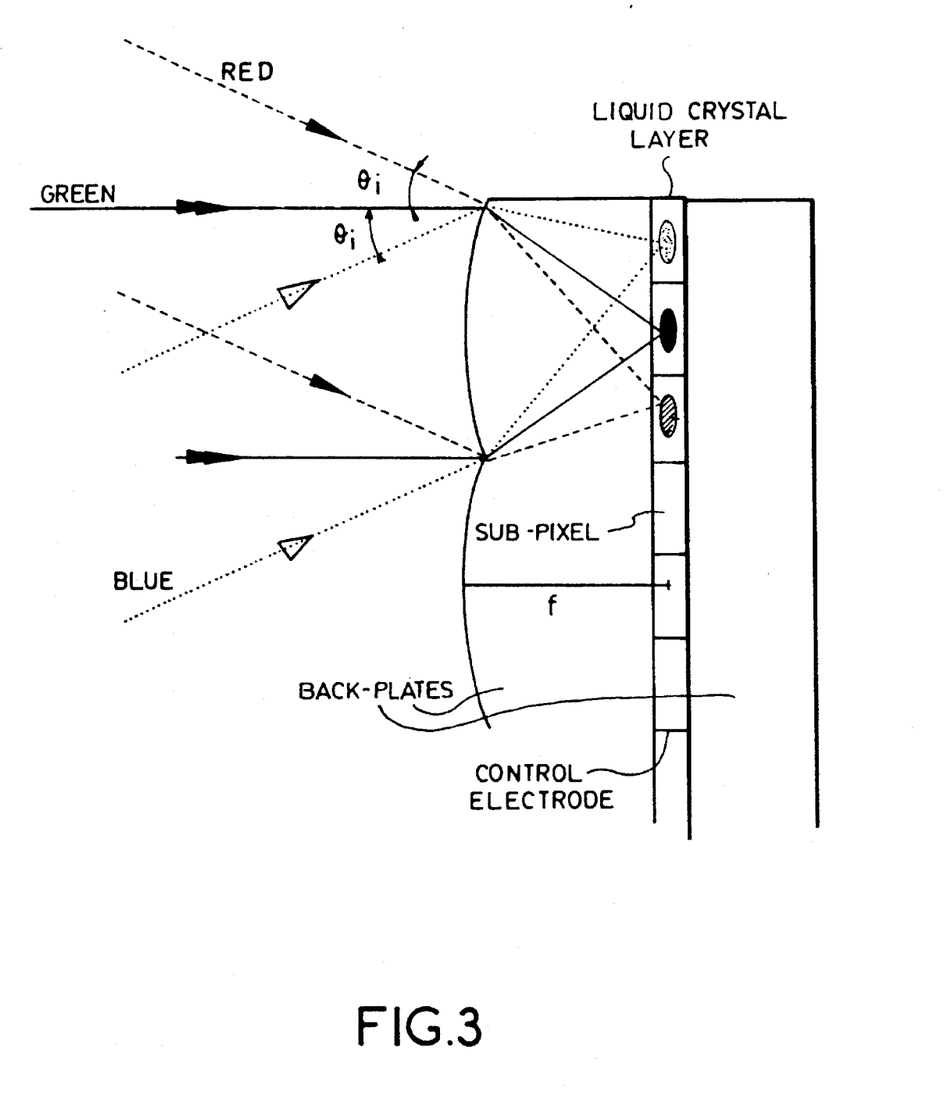
—FIG. 3 shows a detailed view of the device of FIG. 1.
Figure 4:
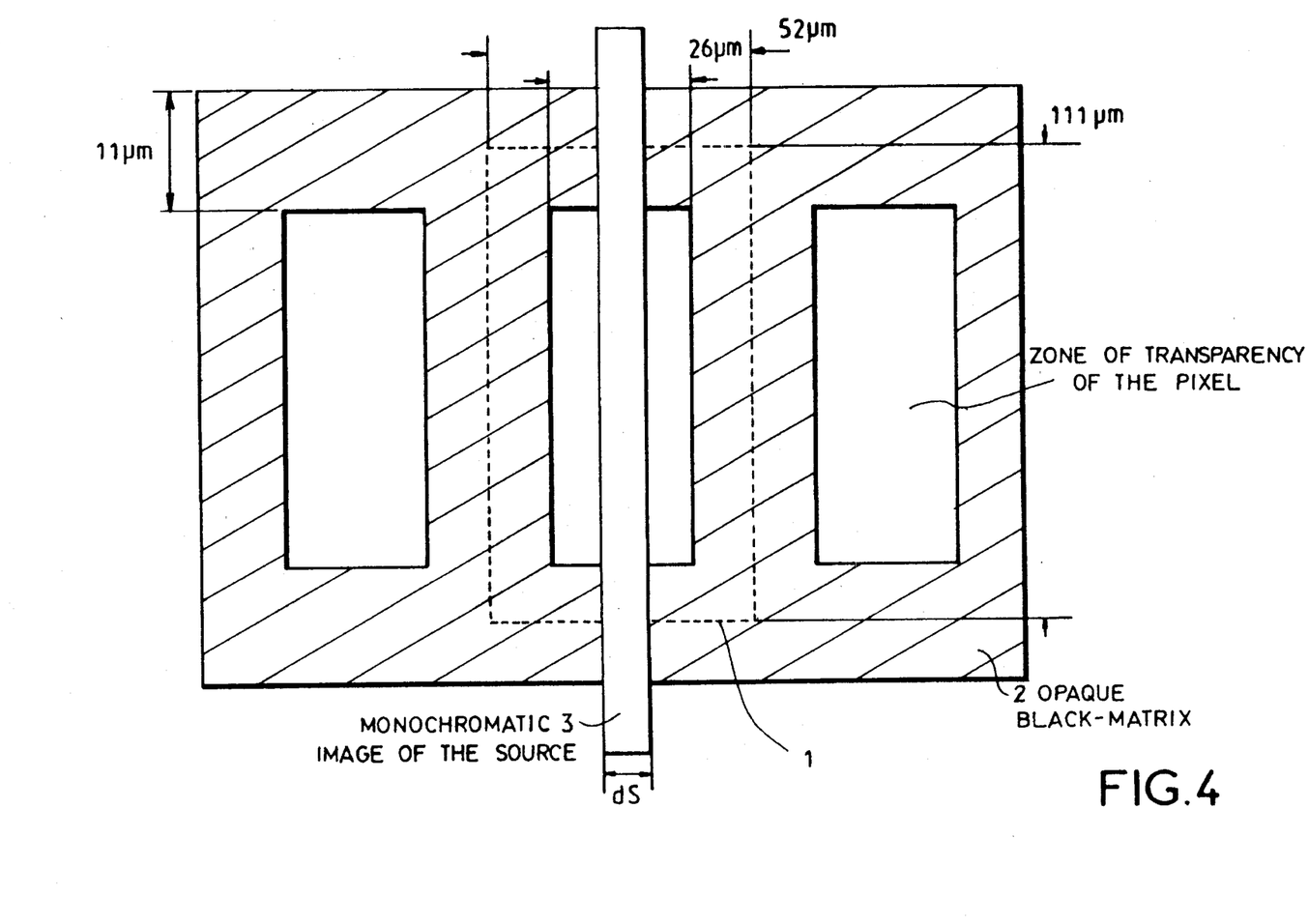
—FIG. 4 shows a detailed view of a picture element of a liquid crystal screen.

The principle of operation of the device can be described as follows: the function of the separator RC enables the angular separation of the three spectral components of the collimated illumination source. These three spectral bands are then focused along three parallel colored lines in the focal plane of each cylindrical lens. According to the exemplary embodiment of FIG. 1, which is shown in detail in FIG. 3, the green beam G is normal to the focal plane of the lenses MLC and the beams R and B (red and blue) are symmetrical with respect to this normal and form an angle of incidence $\theta_i$. Consequently, by choosing firstly the angle of incidence $\theta_i$ of each spectral component on the cylindrical micro-lenses and secondly the focal spot f of these micro-lenses, it is possible to achieve the following simultaneously:

—the successive focusing of each color in the plane of the liquid crystal is centered on each line of sub-pixels addressed by the same color (FIG. 3). The characteristics ($\theta_i$, f) of the device depend on the size of the LCD screen, the number of pixels and the distribution of sub-pixels in a dot;

—a gain on the transmission rate of the LCD screen when the focused colored band has a size smaller than that of the sub-pixel (FIG. 4). The value of this gain depends on the following parameters: the aperture of the cylindrical microlens (f/h), the geometric extent of the illumination source (Es) and the size of the LCD screen characterized by its diagonal (D).

FIG. 4 shows a detail of the design of a picture element of a liquid crystal screen. A picture element of this kind has the picture element 1 itself, the useful surface area of which is defined by a mask 2 (commonly called a black matrix). According to the invention, the useful surface area of the picture element is illuminated by the illumination beam 3. This beam may have a size (in width in FIG. 4) that is substantially equal to that of the useful surface area. However, the beam 3 preferably has a width smaller than that of the useful surface area.

Figure 5A:
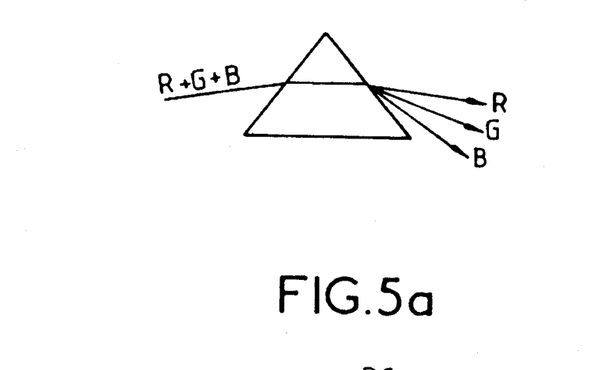
—FIGS. 5a to 5d show different embodiments of a chromatic separator according to the invention.
Figure 5B:
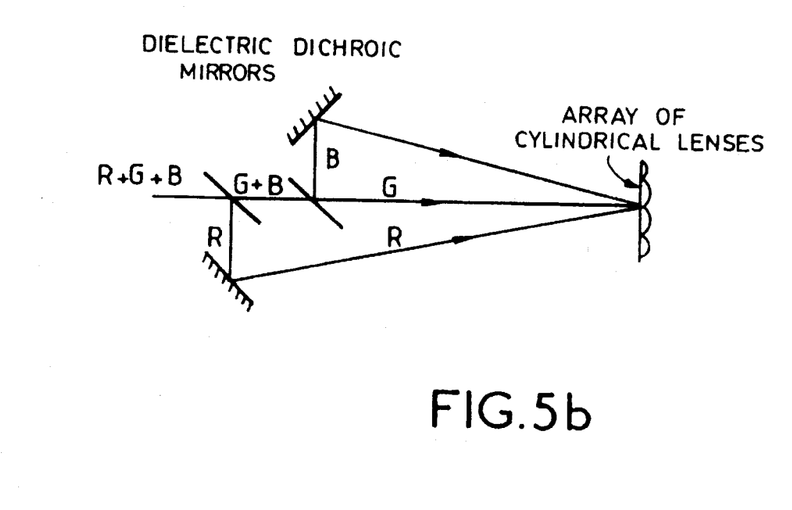
Figure 5C:
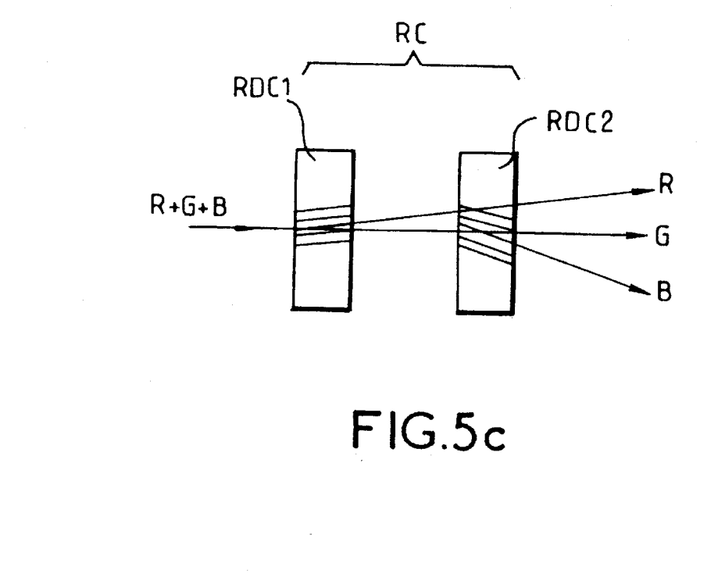
Figure 5D:
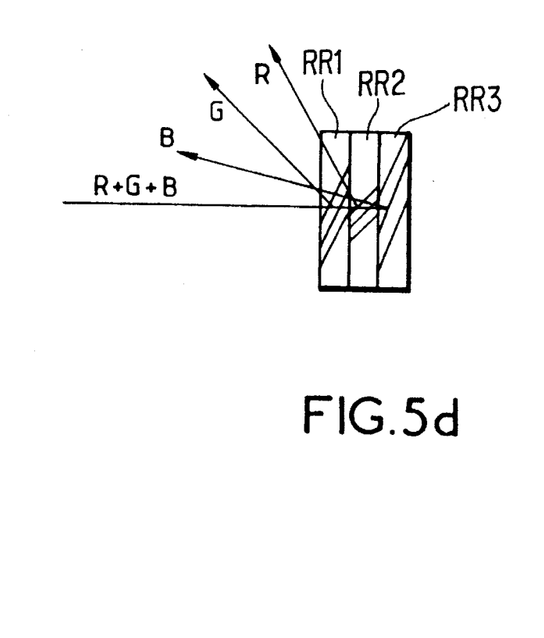

In this device, the function of the separator RC can be fulfilled according to several principles:

(a) standard optical means such as dispersive prisms (FIG. 5a) enabling the separation of the chromatic components R, G, B or an association of dielectric dichroic filters (FIG. 5b). It will be noted however that these means may result in fairly bulky or costly illumination devices;

(b) diffractive optical components such as the association of gratings either in transmission (FIG. 5c) or in reflection (FIG. 5d). According to the separator of FIG. 5c, a first chromatic diffractive grating RDC1 receives a beam RGB along a first direction and enables the diffraction, along a second direction, for example, of the chromatic component R while the components B an G are not deflected. A second chromatic diffractive grating RDC2 enables the diffraction, along a third direction, of the component B while the components R and G are not deflected. At the output of the separator RC, there is therefore a green beam G directed along a first direction, a red beam R along the second direction and a blue beam B along the third direction.

In the separator of FIG. 5d, three diffractive gratings RR1, RR2, RR3 are associated. Each of them reflects the light of only one determined chromatic component along a determined direction. Thus, the three beams R, G, B are obtained in reflection along three different directions. These approaches make it possible, in the case of thick index gratings (for example Bragg gratings) to obtain compact illumination structures with a theoretical optical efficiency of 100%. Indeed, these functions require only small thicknesses, typically smaller than 100 microns, in order to be efficient, and it is possible to achieve the multiplexing, in one and the same film, of several gratings where each grating is intended for the separation of the three spectral bands of the source. It is further possible to make use of certain specific properties of the diffractive components to prepolarize the illumination or to achieve the anamorphosis of the circular section of the illumination beam into an elliptical section that is better suited to efficient illumination of the LCD screen with a 16/9 rectangular format.

Figure 6:
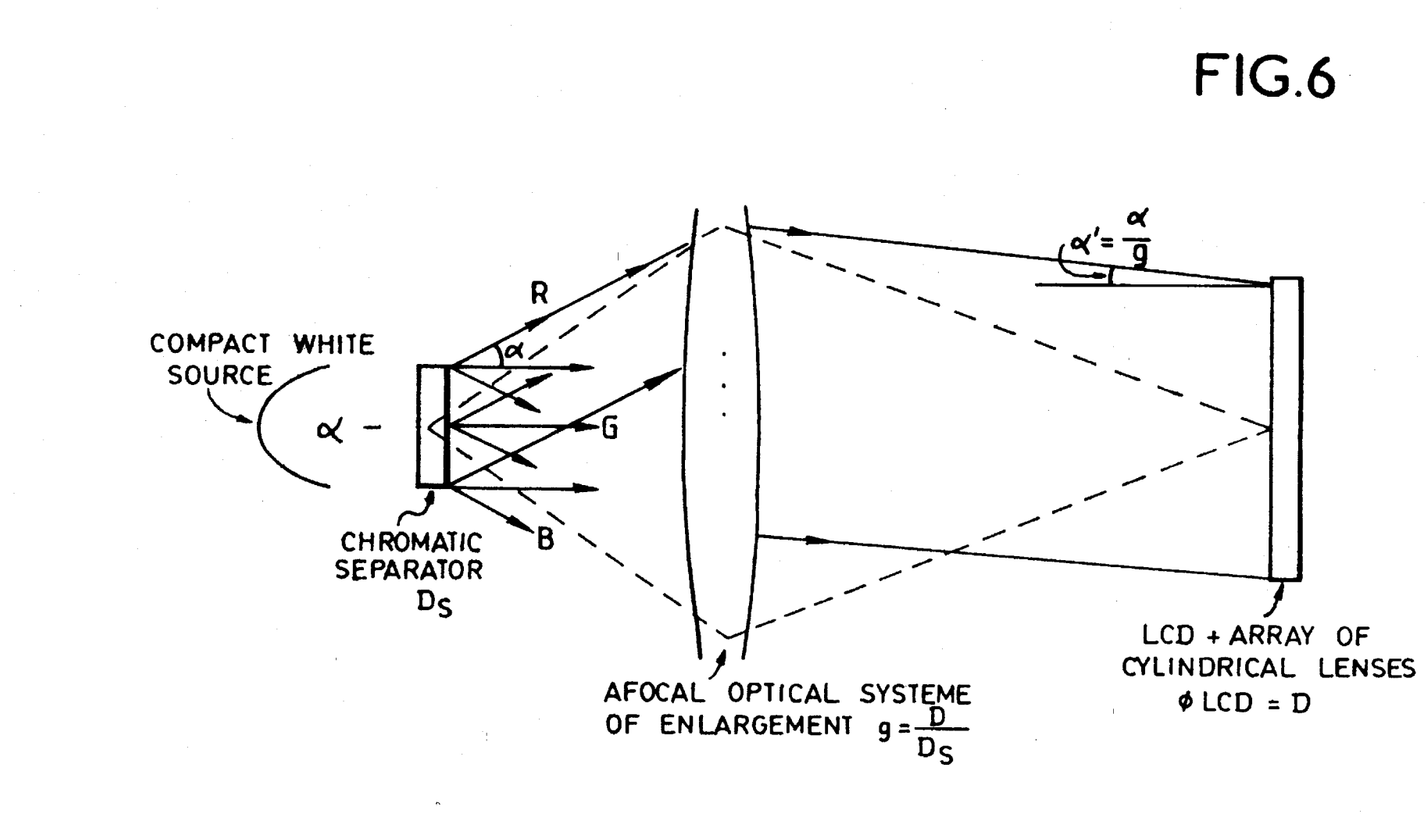
—FIG. 6 shows the device according to the invention comprising an optical enlargement matching device.
Figure 7A:
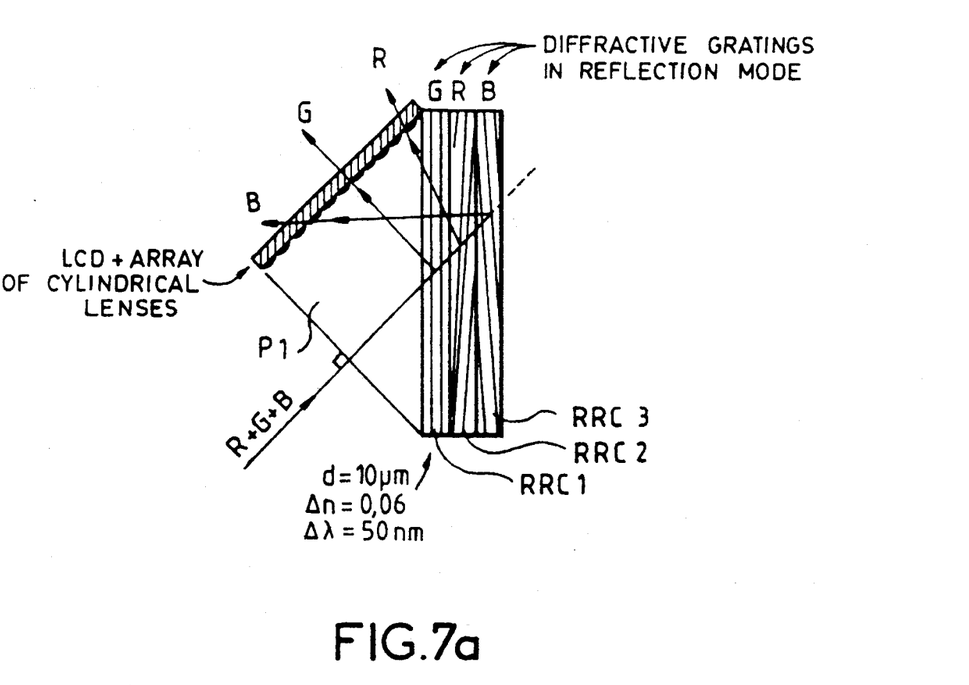
—FIGS. 7a and 7b show devices for chromatic separation by diffraction gratings.
Figure 7B:
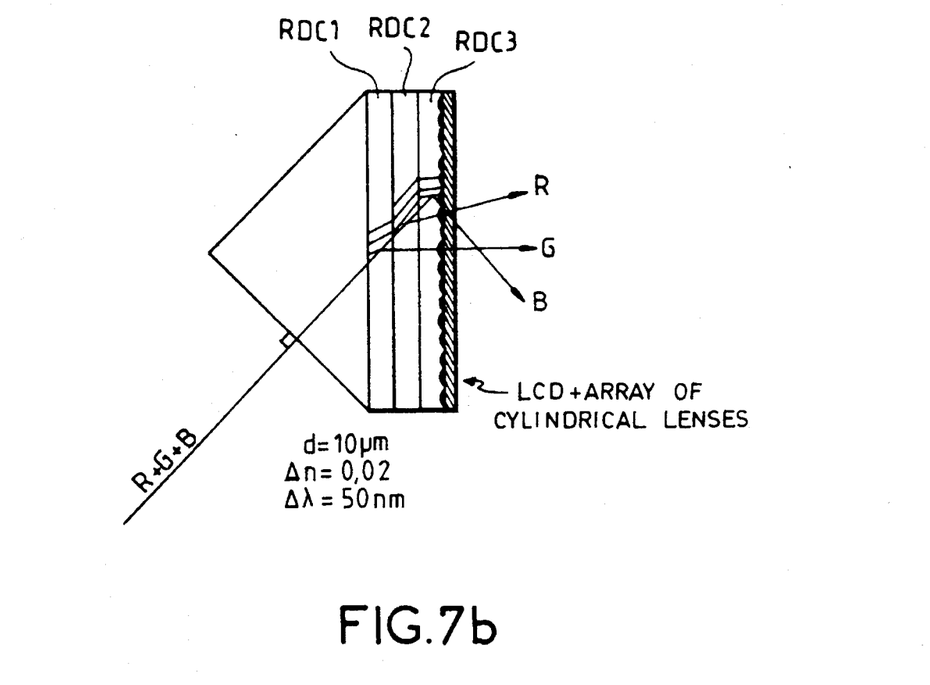

In this device, the separation function can be associated with the LCD screen by the following two means:

—the LCD screen is positioned as closely as possible to the separator RC as in the FIGS. 7a, 7b so that the loss of light is minimal;

—the separator RC is imaged on the LCD screen by an afocal type of optical device enabling the matching of the dimension (Ds) of the light source or separator RC to the dimension (D) of the LCD screen. In this case, the angle of separation of the primary colors (a) will take account of the enlargement or magnification g=D/Ds as indicated in FIG. 6.

The chromatic separator RC of FIG. 7a has three separators RRC1, RRC2, RRC3 enabling the reflection of the light of the spectral bands, namely the green, red and blue bands respectively. These separators are attached to the hypotenuse face of a straight prism P1. The light enters by a face of the prism towards the separators and is reflected towards the other face of the prism to which the array of lenses and the liquid crystal screen are attached.

The chromatic separator RC of FIG. 7b has three elements RDC1, RDC2, RDC3 working in transmission mode. They are attached to a prism and receive the light at an incidence adapted to the periodicity of the microstructures recorded in the elements RDC1 to RDC3. For example, in the case of a 45° incidence, these elements will be attached to a prism at 45°. The array of lenses and the liquid crystal screen are attached to these separators.

Herein there is proposed an exemplary embodiment of the device adapted to an LCD screen size having sub-pixels R, G, B distributed in vertical strips as shown in FIG. 2a.

Characteristics of the LCD screen

—$16/9$ format;

—diagonal D=5 inches corresponding to a screen with a height of 62.5 mm referenced H and a width of 111 mm referenced L, these values being given by the relationship L=$16/9$ H;

—distribution of pixels on 560 lines of 700 RGB dots. The size (pl, ph) of the corresponding sub-pixels is: pl=52.4 microns, ph=111 microns;

—aperture of the pixel, through which the light is transmitted, 45% in the geometry of the pixel described in FIG. 4.

Characteristics of an elementary cylindrical micro-lens LC of the array of lenses MLC —The height h is equivalent to the width of a dot since the arrangement of the sub-pixels is in vertical strips giving:

$h=3 \times pl=157$ microns

—the length of the elementary cylindrical micro-lens being equivalent to the height H of the LCD screen;

—focal distance f: in this example, it is proposed to make the micro-lenses by direct molding on one of the back-plates of the LCD screen. In view of the present standardization of this element, we have:

f=1.1 mm.

Characteristics of the chromatic separator RC

Since each sub-pixel is at a distance of pl in the focal plane of the cylindrical micro-lens, the value of the angular separator angle $\theta_i$ of the beams in the air is given, for the small angles, by the relationship $\theta_i$=n arctan (pl/f)

giving 4 degrees in this example.

Exemplary embodiments of separators such as these shall be given hereinafter.

Characteristics of the illumination source

The characteristics of the geometric extent Es of the illumination source S must be chosen in such a way that the dimension dS of the image of the source in the focal plane of the lens MLC is smaller than or at most equal to the width pl of the sub-pixel. If not, a desaturation of the primary colors produced by the device is obtained since there is an overlapping of the colored illumination bands on one and the same sub-pixel.

The limit value of the geometric extent Es(max) of the source depends on the size of the LCD screen. It can be expressed as follows as a function of the different parameters of the device.

$Es(max)=0.5.D^2.(180/\theta.\arctan (pl/2f))^2$ where D represents the value of the diagonal of the screen expressed in inches.

In the exemplary device proposed, the following is obtained:

Es(max)=25 mm2.sr.

The Xenon type short arc lamps that possess geometric extents of less than 15 mm$^2$.sr are quite suited to this device.

Gain on the rate of optical transmission of the LCD screen

The Xenon type arc lamps which possess geometric extents of less than Es(max) will therefore make it possible to obtain an image of the source with a size dS smaller than the size of the sub-pixel, in one direction. Under these conditions, the value of the optical transmission of the LCD screen is increased artificially since the source is focused in the zone of transparency of the pixel (FIG. 4).

It is possible, as a first approximation, to assume that, in the example of a 5-inch LCD screen for an image dimension such that dS=pl/2, the source is perfectly focused in one dimension. In this case, the effective optical transmission of the LCD screen will depend only on the blocking by the electrode lines of the TFT matrix. If it is assumed that the line electrodes have a width of 11 micrometers, the following values of optical transmission of the LCD screen are obtained:

—45% aperture of a 52×111 micrometer sub-pixel, resulting from the technology used to make the TFT active matrix;

—90% effective optical transmission by using the array of cylindrical micro-lenses and a source with a geometric extent Es(max)/4 giving 6 mm$^2$.sr.

It is important to note that, as compared with prior art projectors which use an LCD screen provided with colored filters, the maximum gain given by this device on the light efficiency is 8 (3 for the filtering plus 1 for the absorption of the colored filters to be multiplied by 2 because of the focusing in one dimension).

Exemplary embodiments of micro-lenses

An array of micro-lenses can be made as follows. The values of the focal distances of the micro-lenses correspond, for an index n of 1.5, to a radius of curvature R given by the relationship R=(n−1)f/n. In our example, we obtain R=366 micrometers by taking the case of a spherical micro-lens section. Lenses such as these can be made in particular with a variety of methods:

—the etching of the profile with the relief $\Delta e$ by mechanical or ion machining. The maximum etching depths are computed by means of the following relationship $\Delta e_{max}=9.pl^2/(8.R)$; giving 8 micrometers in this example;

—micro-lens with index gradient (obtained for example by optical recording in photopolymer materials or by doping obtained by ion diffusion);

—diffractive optics.

It will be noted that the apertures of these micro-lenses remains small (f/h=7): this therefore does not call for the making of astigmatic lenses having a hyperbolic section.

The making of the array of micro-lenses could be done in the case of the relief structures by a molding type of duplication method similar to the one implemented for the copying of optical disks.

Exemplary embodiment of the separator RC

Exemplary embodiments of the separator function R shall now be proposed. These are based on the use of diffractive gratings enabling compact structures to be obtained.

Two exemplary devices have been shown, one working in reflection mode in FIG. 7a the other working in transmission mode in FIG. 7b. In both cases, the function of angular separation consists of three combined index gratings, each carrying out the angular deflection of one of the three spectral bands R, G, B. It is possible to record them either separately in an overlaying of three layers of materials each containing a separator grating, or by multiplexing in a single layer of material.

The characteristics of the recording medium needed to obtain the desired function are an index variation $\delta n<0.1$ and a thickness $d<50$ microns. They may be made out of materials of the photopolymer type (material of the type manufactured by DU PONT DE NEMOURS, bichromated gelatin etc).

Separator in transmission mode

—Pitch of the grating: 0.47 micrometers
—Separation angle 4 degrees
—Thickness: d=10 micrometers
—Index variation: $\delta n=0.02$
—Efficiency of 100% for the center length of 540 nm with a spectral band at 3 dB of 50 nm approximately (FIG. 7b).

Separator in reflection mode

—Pitch of the grating: 0.47 micrometers
—Angular separation 4 degrees
—Thickness: d=10 micrometers
—Index variation: $\delta n=0.06$
—Efficiency of 100% for the center length of 540 nm with a spectral band at 3 dB of about 50 nm (FIG. 7a).

Exemplary projection systems associated with a device

The illumination device proposed does not enable the use of a field lens before the screen as is done in the usual projection structures.

In order to reduce the pupil of the optical projection system, a first approach consists in the use of a field lens after the LCD screen. The angles of the mean rays emerging from the LCD are about ±4 degrees. This dictates the use of a Fresnel type field lens with a focal distance F if it is desired to keep a small distance (t) between the objective and the projection screen and a limited aperture for the projection optical system (this projection architecture comes under the prior art: it is a SHARP projector using XVP1 micro-lenses).

Figure 8:
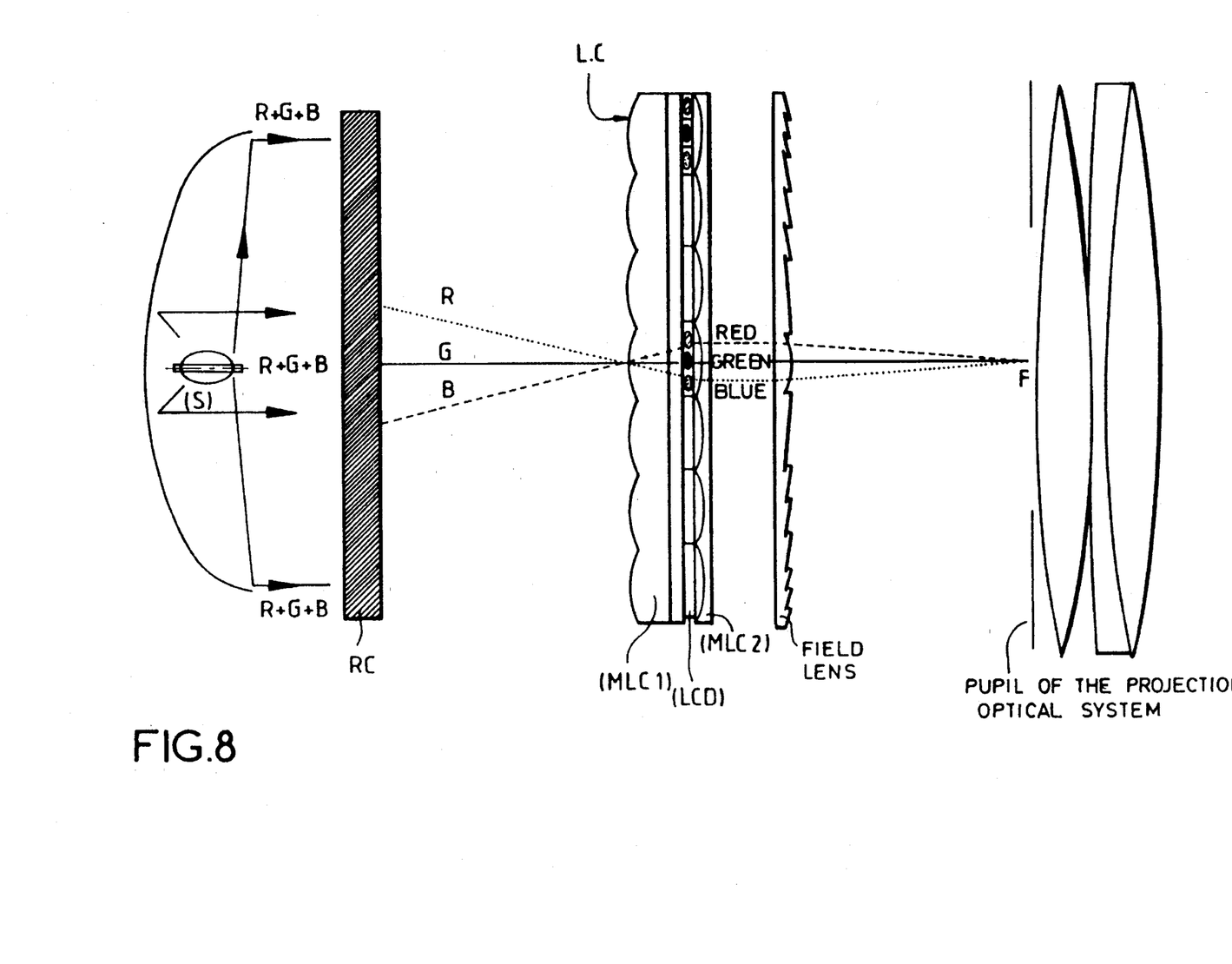
—FIG. 8 shows a detailed view of an exemplary embodiment of a device according to the invention.

Another approach consists in the use, in addition to the field lens positioned after the LCD screen, of a second array of cylindrical lenses (MLC2) positioned on the second back-plate of the LCD screen, at the same focal distances as those of the first array (MLC1), to collimate the mean rays emerging from the LCD as indicated in the example of FIG. 8. The advantage of this device is that it enables the use of a projection optical system whose aperture is smaller than in the first approach proposed.

The different embodiments of cylindrical micro-lenses described here above can be used to make the second array of micro-lenses (MLC2). However, this element has to be thin (thickness $\delta e<100$ micrometers) in order to fulfil its role of a field lens properly: the structure using the Fresnel type micro-lens therefore appears to be particularly well suited to making them since an index variation of 0.2 enables them to be made in a film with a thickness $\Delta e=2$ microns which is compatible with proper functioning of the layer of liquid crystal of the LCD screen.

Extension of the device

—Use of matrices of spherical micro-lenses.
—Use of two arrays of crossed cylindrical micro-lenses.
—Use of linear light sources, the axis of the source being parallel to the cylindrical lenses.
—Application to direct vision large-sized screens.
—Application to projectors using three monochromatic LCD screens.
—Compatibility with devices using polarized illumination (French patent applications No. 90 10251 and 91 09997) or modulators other than LCD that enable the use of both components of polarization of light (PDLC, the micrograting approach of the French patent application No. 91 08813).

Figure 9:
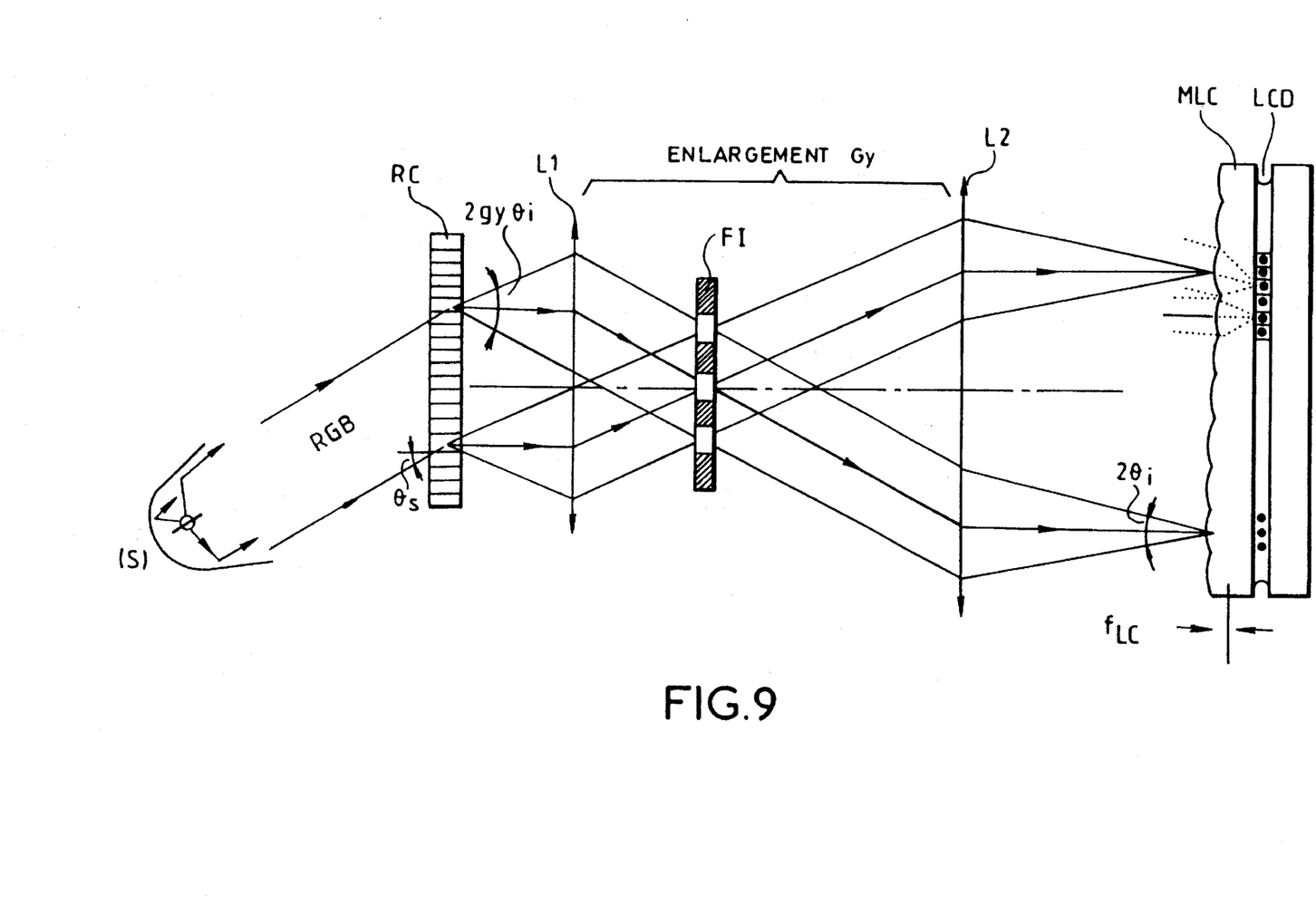
—FIGS. 9 and 10 show alternative embodiments of the invention.

FIG. 9 shows a device that can be used to carry out filtering of the different colors and to modulate the intensity of each color or to give the colors "weight" (luminance and chrominance).

Between the separator RC and the array of micro-lenses, there are placed a first lens L1, a spatial filter FI and a second lens L2.

The lens OP, associated with the source S, sends the separator RC a beam of parallel rays RGB. The separator RC separates this beam into several beams (red, green and blue) which themselves have rays that are parallel but have different directions. The first lens L1 focuses each of these beams in its focal plane. The filter FI is located in this focal plane and has an elementary spatial filter in each zone of focusing of the beams of colors. Each of these elementary spatial filters lets through only the light focused in the corresponding zone. Furthermore, certain elementary filters may have intensity modulators to modulate the light. For example, the elementary filters corresponding to a determined color may each have an attenuator to reduce the density of this color with respect to the other colors. This makes it possible to adjust the chrominance of the system.

The second lens L2 is located in such a way that its image focal plane coincides with the object focal plane of the lens L1 and hence of the filter FI. Each color beam received by the lens L2 is thus collimated by this lens L2 and the array of micro-lenses MLC receives color beams with parallel rays. Each micro-lens of the array MLC focuses a part of each of these beams on a pixel of the LCD screen.

Figure 10:
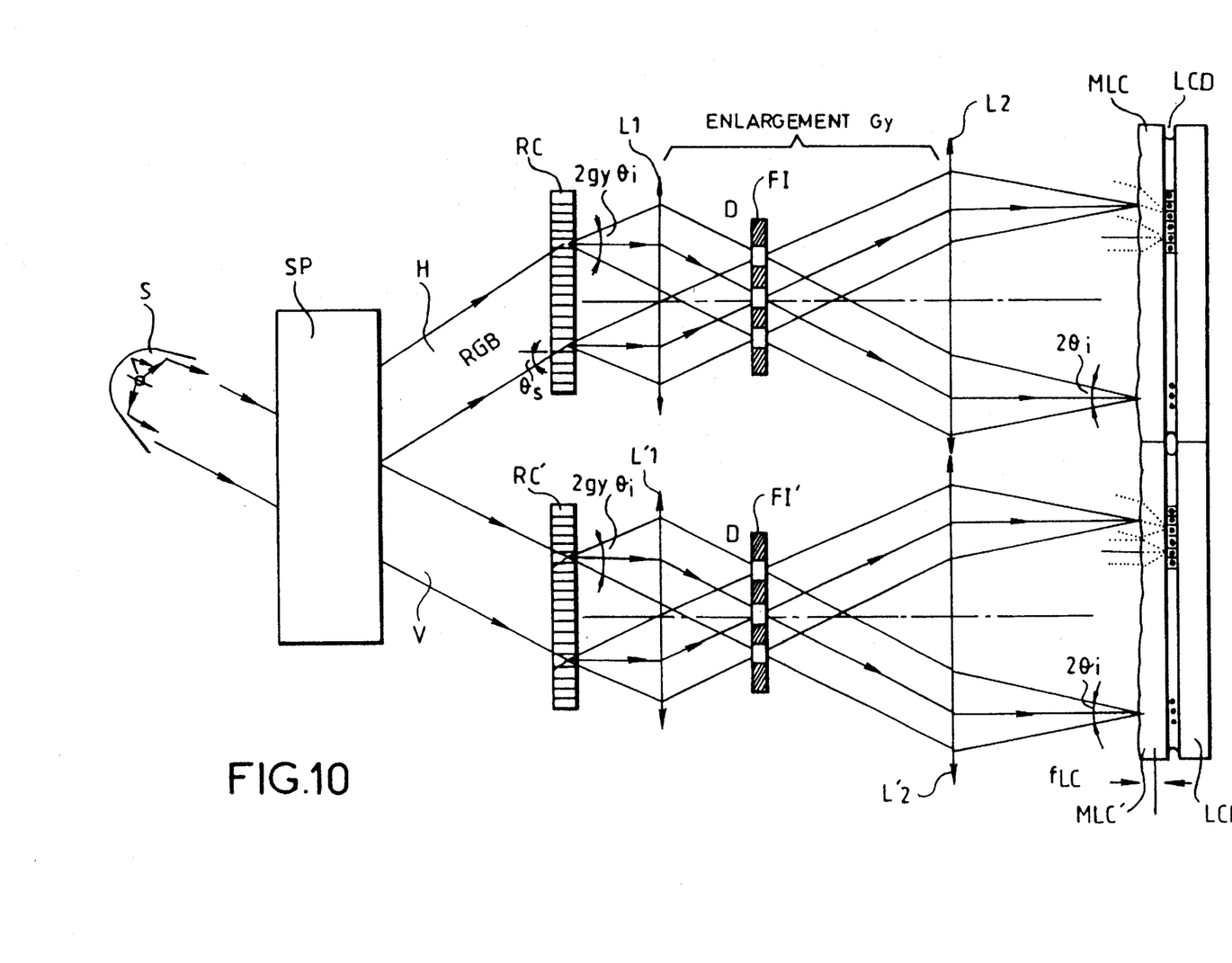

FIG. 10 exemplifies a combination of two devices such as that of FIG. 9 made in order to process both polarizations. The light emitted by the source S is transmitted to a polarization separator SP which gives two beams H and V with orthogonal polarizations. This separator SP may be a holographic separator such as is known in the prior art (see French patent applications No. 91 09997 or 91 15641). Each beam H and V is processed by a device such as the one of FIG. 10. The beam H is processed by the device RC, L1, FI, L2, MLC, LCD. The beam V is processed by the device RC', L'1, FI', L'2, MLC', LCD'. The two LCD screens are placed side by side and can each be used to display half of an image. According to a preferred embodiment, the set LCD-LCD' thus enables the display of a rectangular image, for example an image with a 16/9 format.

What is claimed is:

1. A color display device comprising a light source that simultaneously emits light having several ranges of chromatic components and a spatial light modulator comprising several dots, each dot comprising at least one sub-pixel per range of chromatic components to be displayed, wherein said device also comprises the following elements between the light source and the spatial light modulator:

- at least one chromatic separator positioned to receive the light from the light source and chromatically angularly separating the light of the different chromatic ranges angularly along different directions;
- a lens positioned to receive the light separated by the chromatic separator and focussing the light of the different chromatic ranges at distinct points or along distinct lines contained in a focal plane;
- at least one spatial filter located along this focal plane and selectively filtering the light of the different chromatic ranges;
- an array of lenses positioned to receive the chromatically angularly separated light, a first lens of said array of lenses focusing the light of a first chromatic range substantially on a first sub-pixel of a first dot, focusing light of a second chromatic range on a second sub-pixel of the first dot, and focusing light of a third chromatic range on a third sub-pixel of the first dot; and
- wherein the array of lenses focus the light in a focal plane which coincides with said spatial light modulator.

2. A color display device comprising a light source simultaneously emitting several ranges of chromatic components and a spatial light modulator comprising several dots, each dot comprising one sub-pixel per range of chromatic component to be displayed, wherein said device also comprises the following between the light source and the spatial light modulator;

- at least one chromatic separator comprising a component with index variations or relief features obtained by optical recording in a photosensitive material, this separator separating the light of the different chromatic ranges angularly along different directions providing chromatically angularly separated light;
- an array of lenses, a first lens of said array of lenses focusing the light of a first chromatic range substantially on a first sub-pixel, focusing light of a second chromatic range on a second sub-pixel, and focusing light of a third chromatic range on a third sub-pixel;
- wherein the light of the first, second, and third chromatic ranges overlap at said first lens.

3. A device according to one of the claims 1 or 2, wherein the array of lenses is attached to the spatial light modulator and has an array of cylindrical lenses, each cylindrical lens being arranged in parallel to a line of dots.

4. A device according to claim 3, wherein the array of lenses has dimensions substantially equal to those of the spatial light modulator.

5. A device according to claim 4, wherein the width of each lens is substantially equal to that of a strip of dots.

6. A device according to one of the claims 1 or 2, wherein the spatial light modulator is a liquid crystal screen.

7. A device according to one of the claims 1 or 2, wherein the chromatic separator comprises a separator made of a material comprising a component with index variations or relief features obtained by optical recording in a photosensitive material, this separator by range of chromatic component being recorded to diffract the light of this chromatic range.

8. A device according one of the claims 1 or 2 comprising a prism, the separator being attached to one of the faces of the prism and receiving the light from the source at an incidence adapted to the periodicity of the phase microstructures.

9. A device according to claim 8, wherein the separator works in transmission mode and is attached to the assembly formed by the array of lenses and the spatial light modulator.

10. A device according to claim 1, comprising a first lens focusing the light given by the separator in the plane of the spatial filter, a second lens receiving the light from the spatial filter and transmitting beams of rays parallel to the array of micro-lenses.

11. A device according to one of the claims 1 or 2, wherein a chromatic component of light is not deflected by the separator and keeps its direction of propagation after crossing the separator while the other two chromatic components are deflected symmetrically with respect to this direction of propagation.

12. A device according to claim 1, wherein the light of the different chromatic ranges overlap at said array of lenses.

13. A device according to claim 2, comprising one spatial filter per chromatic range.

14. A color display device comprising a light source that simultaneously emits light having several ranges of chromatic components and a spatial light modulator comprising several dots, each dot comprising at least one sub-pixel per range of chromatic components to be displayed, wherein said device also comprises the following elements between the light source and the spatial light modulator:

- at least one chromatic separator positioned to receive the light from the light source and chromatically angularly separating the light of the different chromatic ranges angularly along different directions;
- a lens positioned to receive the light separated by the chromatic separator and focussing the light of the different chromatic ranges at distinct points or along distinct lines contained in a focal plane;
- at least one spatial filter located along this focal plane and selectively filtering the light of the different chromatic ranges;
- a array of lenses positioned to receive the chromatically angularly separated light one each lens of said array of lenses focusing the light of a first chromatic range substantially on a first sub,pixel focusing light of a second chromatic range on a second sub-pixel, and focusing light of a third chromatic range on a third sub-pixel;

wherein the array of lenses focus the light in a focal plane which coincides with said spatial light modulator;

a prism; and wherein the separator works in reflection mode and transmits the light to an output face of the prism to which the unit formed by the array of lenses and the spatial light modulator is attached.

15. An apparatus, comprising:

a light source, a polarization separator, and first and second juxtaposed color display devices, the light source emitting light having several ranges of chromatic components, the polarization separator transmitting light polarized in a first direction to the first display device and light polarized in a second direction that is perpendicular to the first direction to the second display device, each of the first and second display devices comprising a spatial light modulator comprising several dots., each dot comprising at least one sub-pixel per range of chromatic components to be displayed, and wherein each of the first and second display device also comprises the following elements between the light source and the spatial light modulator:

—at least one chromatic separator positioned to receive the light from the light source and chromatically angularly separating the light of the different chromatic ranges angularly along different directions;

—a lens positioned to receive the light separated by the chromatic separator and focussing light of the different chromatic ranges at distinct points or along distinct lines contained in a focal plane;

—at least one spatial filter located along this focal plane and selectively filtering the light of the different chromatic ranges;

—an array of lenses positioned to receive the chromatically separated light, a first lens of said array of lenses focusing the light of a first chromatic range substantially on a first sub-pixel of a first dot, focusing light of a second chromatic range on a second sub-pixel of the first dot, and focusing light of a third chromatic range on a third sub-pixel of the first dot;

wherein the array of lenses focus the light in a focal plane which coincides with said spatial light modulator.

* * * * *

UNITED STATES PATENT AND TRADEMARK OFFICE
CERTIFICATE OF CORRECTION

PATENT NO. : 5,467,206
DATED : November 14, 1995
INVENTOR(S) : Brigitte LOISEAUX et al.

It is certified that error appears in the above-indentified patent and that said Letters Patent is hereby corrected as shown below:

**On title page, and
     column 1, lines 1-6,** Item [54], the title, should read:

--COLOR DISPLAY DEVICE WITH INTERVENING LENS AND SPATIAL

FILTERS OR WITH OVERLAPPING BEAMS OF CHROMATICALLY

SEPARATED LIGHT BETWEEN THE CHROMATIC SEPARATOR AND LENS

ARRAY--

Signed and Sealed this

Twenty-seventh Day of February, 1996

*Attest:*

BRUCE LEHMAN

*Attesting Officer*     Commissioner of Patents and Trademarks